(12) United States Patent
Xin

(10) Patent No.: US 7,228,244 B2
(45) Date of Patent: Jun. 5, 2007

(54) METHOD AND APPARATUS FOR DIRECTION-OF-ARRIVAL TRACKING AND THEIR APPLICATION TO BEAMFORMING AT BASE-STATION

(75) Inventor: Jingmin Xin, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/204,581

(22) Filed: Aug. 16, 2005

(65) Prior Publication Data

US 2006/0212237 A1 Sep. 21, 2006

(30) Foreign Application Priority Data

Mar. 17, 2005 (JP) .............. 2005-076716

(51) Int. Cl.
*G01R 25/00* (2006.01)
*G01C 9/00* (2006.01)
(52) U.S. Cl. ........................ 702/65; 702/150
(58) Field of Classification Search .......... 702/65, 702/92, 93, 150–154
See application file for complete search history.

(56) References Cited

U.S. PATENT DOCUMENTS

| 5,404,253 | A | * | 4/1995 | Painter ............... 360/77.04 |
| 6,064,338 | A | * | 5/2000 | Kobayakawa et al. ..... 342/378 |
| 7,068,221 | B2 | * | 6/2006 | Xin ................. 342/432 |
| 2005/0285788 | A1 | * | 12/2005 | Xin ................. 342/432 |
| 2006/0007043 | A1 | * | 1/2006 | Xin ................. 342/417 |
| 2006/0066474 | A1 | * | 3/2006 | Shirakawa ............ 342/147 |

FOREIGN PATENT DOCUMENTS

EP 1 703 297 * 9/2006

OTHER PUBLICATIONS

Ralph O. Schmidt. Multiple Emitter Location and Signal Parameter Estimation. IEEE Transactions on Antennas and Propagation, vol. 34, No. 3, pp. 276-280, Mar. 1986.

T.J. Shan et al. On Spatial Smoothing for Direction-of Arrival Estimation of Coherent Signals. IEEE Transactions on Acoustics, Speech and Signal Processing, vol. 33, No. 4, Aug. 1985.

S. Unnikrishna Pillai et al. Forward/ Backward Spatial Smoothing Techniques for Coherent Signal Identification. IEEE Transactions on Acoustics, Speech and Signal Processing, vol. 37, No. 1, Jan. 1989.

(Continued)

*Primary Examiner*—Michael Nghiem
(74) *Attorney, Agent, or Firm*—Katten Muchin Rosenman LLP

(57) ABSTRACT

A direction tracking method is proposed for quickly tracking directions-of-arrival of radio waves even in an environment where trajectories of the directions-of-arrival intersect. With the tracking method, the state vectors of directions-of-arrival (composed of a direction-of-arrival and the angular velocity and acceleration of the direction-of-arrival) at the current direction updating time are predicted with an observer by using state vectors of directions-of-arrival at the previous direction updating time to calculate provisional estimates of the directions-of-arrival, and furthermore, the state vectors at the current direction updating time are calculated based on the provisional estimates, the predicted state vectors, and predicted values of the directions-of-arrival to calculate estimates of the directions-of-arrival from the state vectors.

19 Claims, 14 Drawing Sheets

OTHER PUBLICATIONS

A. Eriksson et al. On-line Subspace Algorithms for Tracking Moving Sources. IEEE Transactions on Signal Processing, vol. 42, No. 5, Sep. 1994.

J. Xin et al. Directions-of-Arrival Tracking of Coherent Cyclostationary Signals in Array Processing. IEICE Trans. Fundamentals, vol. 86, No. 8 Aug. 2003.

J. Xin et al. Computationally Efficient Subspace-Based Method for Direction-of Arrival Estimation without Eigendecomposition. IEEE Transactions on Signal Processing, vol. 52, No. 4, Apr. 2004.

J. Xin et al. Efficient Subspace-based Algorithm for Adaptive Direction Estimation and Tracking of Narrowband Signals. Proc. IFAC 8$^{TH}$Workshop on Adaptation and Learning in Control and Signal Processing pp. 535-540, 2004.

J. Xin et al. Array Beamforming Based on Cyclic Signal Detection. Proc. 48$^{th}$IEEE Vehicular Technology Conference, pp. 890-894, 1998.

J. Xin et al. Subspace-based Adaptive Direction Estimation and Tracking Multipath Environment. 2005 IEEE International Conference on Acoustics, Speech and Signal Processing. Mar. 2005.

Otis Lamont Frost, III. An Algorithm for Linearly Constrained Adaptive Array Processing, Proceedings of the IEEE, Vo. 60, No. 8, Aug. 1972.

European Search Report dated Apr. 19, 2004.

Jingmin Xin, et al. "Efficient Subspace-Based Algorithm for Adaptive Bearing Estimation and Tracking" IEEE Transactions on Signal Processing, vol. 53, No. 12, Dec. 2005, pp. 4485-4505, XP009064631.

Jingmin Xin, et al. "Computationally Efficient Subspace-Based Method for Direction-of- Arrival Estimation With Eigendecomposition" IEEE Transactions on Signal Processing, vol. 52, No. 4, Apr. 2004, pp. 876-893, XP002985946.

Anders Eriksson et al. "On-line Subspace Algorithms for Tracking Moving Sources" IEEE Transactions on Signal Processing, vol. 42, No. 9, Sep. 1, 1994, pp. 2319-2329, XP000477173.

Carlos E. Davila et al. "Efficient Estimation of Signal Subspace without Eigendecomposition" IEEE Transactions on Signal Processing, vol. 42, No. 1, Jan. 1, 1994, pp. 236-239, XP000426582.

Petre Stoica et al. "Subspace-Based Algorithms Without Eigendecomposition for Array Signal Processing" Statistical Signal and Array Processing, vol. 4, Apr. 27, 1993, pp. 33-36, XP010110727.

\* cited by examiner $R = E\{y(k)y^H(k)\} =$ $$\begin{bmatrix} r_{11} & r_{12} & \cdots & r_{1M} \\ r_{21} & r_{22} & \cdots & r_{2M} \\ \cdots & \cdots & \cdots & \cdots \\ r_{M1} & r_{M2} & \cdots & r_{MM} \end{bmatrix} = \begin{bmatrix} \bar{r}_{11} & \bar{r}_{12} & \cdots & \bar{r}_{1M} \\ \bar{r}_{21} & \bar{r}_{22} & \cdots & \bar{r}_{2M} \\ \cdots & \cdots & \cdots & \cdots \\ \bar{r}_{M1} & \bar{r}_{M2} & \cdots & \bar{r}_{MM} \end{bmatrix} + \begin{bmatrix} \sigma^2 & 0 & \cdots & 0 \\ 0 & \sigma^2 & \cdots & 0 \\ \cdots & \cdots & \cdots & \cdots \\ 0 & 0 & \cdots & \sigma^2 \end{bmatrix}$$

FIG. 6

$$\begin{array}{c} \phantom{y_1} \quad y_1^* \quad y_2^* \;\cdots\; y_p^* \quad y_{p+1}^* \;\cdots\; y_{L-1}^* \quad y_L^* \;\cdots\; y_{M-1}^* \quad y_M^* \end{array}$$

$$\begin{array}{c} y_1 \\ y_2 \\ \vdots \\ y_p \\ y_{p+1} \\ \vdots \\ y_{L-1} \\ y_L \\ \vdots \\ y_{M-1} \\ y_M \end{array} \begin{bmatrix} r_{11} & r_{12} & \cdots & r_{1p} & r_{1,p+1} & \cdots & r_{1,L-1} & r_{1,L} & \cdots & r_{1,M-1} & r_{1M} \\ r_{21} & & & & & & & & & & r_{2M} \\ \vdots & & \ddots & & & & & & & & \vdots \\ r_{p1} & & & \ddots & & & & & & & r_{pM} \\ r_{p+1,1} & & & & \ddots & & & & & & r_{p+1,M} \\ \vdots & & & & & \ddots & & & & & \vdots \\ r_{L-1,1} & & & & & & \ddots & & & & r_{L-1,M} \\ r_{L1} & & & & & & & \ddots & & & r_{LM} \\ \vdots & & & & & & & & \ddots & & \vdots \\ r_{M-1,1} & & & & & & & & & & r_{M-1,M} \\ r_{M1} & r_{M2} & \cdots & r_{Mp} & r_{M,P+1} & \cdots & r_{M,L-1} & r_{ML} & \cdots & r_{M,M-1} & r_{M,M} \end{bmatrix}$$

$$\begin{array}{c} \phantom{y_1} \quad y_1^* \quad y_2^* \quad \cdots \quad y_p^* \quad y_{p+1}^* \quad \cdots \quad y_{L-1}^* \quad y_L^* \quad \cdots \quad y_{M-1}^* \quad y_M^* \\ \begin{array}{c} y_1 \\ y_2 \\ \vdots \\ y_p \\ y_{p+1} \\ \vdots \\ y_{L-1} \\ y_L \\ \vdots \\ y_{M-1} \\ y_M \end{array} \left[ \begin{array}{ccccccccccc} r_{11} & r_{12} & \cdots & r_{1p} & r_{1,p+1} & \cdots & r_{1,L-1} & r_{1,L} & \cdots & r_{1,M-1} & r_{1M} \\ r_{21} & & \ddots & & & & & & & & r_{2M} \\ \vdots & & & & & & & & & & \vdots \\ r_{p1} & & & & & & & & & & r_{pM} \\ r_{p+1,1} & & & & & & & & & & r_{p+1,M} \\ \vdots & & & & & \ddots & & & & & \vdots \\ r_{L-1,1} & & & & & & & & & & r_{L-1,M} \\ r_{L1} & & & & & & & \ddots & & & r_{LM} \\ \vdots & & & & & & & & & & \vdots \\ r_{M-1,1} & & & & & & & & & & r_{M-1,M} \\ r_{M1} & r_{M2} & \cdots & r_{Mp} & r_{M,P+1} & \cdots & r_{M,L-1} & r_{ML} & \cdots & r_{M,M-1} & r_{M,M} \end{array} \right] \end{array}$$

METHOD AND APPARATUS FOR DIRECTION-OF-ARRIVAL TRACKING AND THEIR APPLICATION TO BEAMFORMING AT BASE-STATION

CROSS-REFERENCE TO RELATED APPLICATIONS

This application is based on, and claims priority to, Japanese Application No. 2005-076716, filed Mar. 17, 2005, in Japan, and which is incorporated herein by reference.

BACKGROUND OF THE INVENTION

1. Field of the Invention

The present invention relates to radio-wave direction-of-arrival tracking methods and their apparatuses. In particular, the present invention relates to a direction-of-arrival tracking method and apparatus for estimating the directions-of-arrival of radio waves received by an adaptive array antenna.

2. Description of the Related Art

There have been recent interests in the research and development of mobile communication systems using an adaptive array antenna. A typical array antenna includes a plurality of antenna elements arranged in different spatial locations such that the outline of the antenna elements has a certain geometry shape. A technique for estimating the directions-of-arrival of radio waves (hereinafter, a radio wave may be referred to as a signal from the viewpoint of signal processing) impinging on an array antenna is one of the most important fundamental technologies associated with adaptive array antennas.

Subspace-based methods are well-known approaches to the issue of estimating the directions-of-arrival of signals because of its estimation accuracy and computational load, where the orthogonality between the signal subspace and the noise subspace is exploited. The multiple signal classification (MUSIC) technique is a typical one of subspace-based methods (refer to, for example, R. O. Schmidt, "Multiple emitter location and signal parameter estimation," IEEE Trans. Antennas and Propagation, vol. 34, no. 3, pp. 276–280 (1986)). The subspace-based method with spatial smoothing is also well known as an approach to estimate the directions-of-arrival of coherent signals with full correlation. A typical example of the subspace-based method with spatial smoothing is the spatial smoothing based MUSIC technique (refer to, for example, T. J. Shan, M. Wax and T. Kailath, "On spatial smoothing for direction-of-arrival estimation of coherent signals," IEEE Trans. Acoust., Speech, Signal Processing, vol. 33, no. 4, pp. 806–811 (1985) and S. U. Pillai and B. H. Kwon, "Forward/backward spatial smoothing techniques for coherent signals identification," IEEE Trans. Acoust., Speech, Signal Processing, vol. 37, no. 1, pp. 8–15 (1989)).

In the subspace-based method for estimating the directions-of-arrival of uncorrelated signals, first an array covariance matrix is estimated from the noisy received array data, and then a signal subspace and a noise subspace are obtained through the eigenvalue decomposition (EVD) of this array covariance matrix. Thereafter, the orthogonality between the signal subspace and the noise subspace is exploited to estimate the directions-of-arrival of the incident signals. On the other hand, for the estimation of the directions-of-arrival of correlated signals (including signals with full correlation, i.e., coherent signals), in order to suppress the correlation among the incoming signals, an antenna having M array elements arranged in different spatial locations along a straight line at the same adjacent spacing (hereinafter, such an antenna may be referred to as a uniform linear array (ULA)) is divided into overlapping subarrays and then the covariance matrices of the subarrays are averaged to restore the number of dimensions of the signal subspace of the spatially averaged covariance matrix to the number of incident signals. Thus, the orthogonal relationship between the signal subspace and the noise subspace can be exploited to estimate the directions-of-arrival of correlated signals in the same manner as the subspace-based method for estimating the directions-of-arrival of uncorrelated signals.

Details of the spatial smoothing based MUSIC method for estimating the directions-of-arrival of coherent signals proposed in S. U. Pillai and B. H. Kwon, "Forward/backward spatial smoothing techniques for coherent signals identification," IEEE Trans. Acoust., Speech, Signal Processing, vol. 37, no. 1, pp. 8–15 (1989) is described as follows.

Now, suppose that p narrow-band signals $\{s_i(k)\}$ are incident upon a uniform linear array (ULA) along the angles $\{\theta_i\}$. If $T_s$ denotes the sampling intervals, a signal received by each element is written as Equation (1).

$$y(k) = [Y_1(k), y_2(k), \ldots, y_M(k)]^T = A(\theta(k))s(t) + w(k)$$

$$A \triangleq [a(\theta_1(k)), a(\theta_2(k)), \ldots, a(\theta_p(k))]$$

$$a(\theta_i(k)) \triangleq [1, e^{j\omega_0\tau(\theta_i(k))}, \ldots, e^{j\omega_0(M-1)\tau(\theta_i(k))}]^T$$

$$s(k) = [s_1(k), s_2(k), \ldots, s_p(k)]^T$$

$$w(k) = [w_1(k), w_2(k), \ldots, w_M(k)]^T$$

$$\omega_0 = 2\pi f_0, \quad \tau(\theta_i(k)) \triangleq (d/c)\sin\theta_i(k) \quad (1)$$

where $f_o$, c, and d indicate the carrier frequency and propagation speed of the carrier wave, and the element interval (half-wave length), respectively. $(\cdot)^T$ denotes transposition, and $a(\theta_i(k))$ and A correspond to the array response vector and matrix, respectively. $w_i(k)$ indicates the spatially and temporally uncorrelated complex white Gaussian noise with zero-mean and variance $\sigma^2$.

First, we consider the case that the directions-of-arrival of signals are constant over time, i.e., $\theta_i(k) = \theta_i$. In this case, an array covariance matrix is written as Equation (2).

$$R \triangleq E\{y(k)y^H(k)\} = AR_sA^H + \sigma^2 I_M \quad (2)$$

where $E\{\cdot\}$ and $(\cdot)^H$ indicate expectation operation and complex conjugate transposition respectively, $R_s = E\{S(k)S^H(k)\}$ is a covariance matrix of the incident signals, and $I_M$ is an M×M identity matrix. Furthermore, if the correlation $r_{im}$ between the received data $y_i(k)$ and $y_m(k)$ is defined as $r_{im} = E\{y_i(k)y^*_m(k)\}$, a relationship $r_{im} = r^*_{mi}$ holds, where $(\cdot)^*$ denotes a complex conjugate. The array covariance matrix R in Equation (2) can be definitely represented as Equation (3).

$$R = \begin{bmatrix} r_{11} & r_{12} & \cdots & r_{1M} \\ r_{21} & r_{22} & \cdots & r_{2M} \\ \vdots & \vdots & \ddots & \vdots \\ r_{M1} & r_{M2} & \cdots & r_{MM} \end{bmatrix} \quad (3)$$

In order to estimate the directions-of-arrival $\{\theta_k\}$ of coherent signals, the spatial smoothing based MUSIC method divides the entire array into L overlapping subarrays each of which includes m ($1 \leq m \leq M$) elements.

FIG. 14 is a diagram depicting subarrays in a uniform linear array (ULA).

As shown in FIG. 14, an array antenna 100 is composed of M antenna elements 101 arranged at the same adjacent spacing d, and is divided into L overlapping subarrays. In this structure, m and L are referred to as the subarray size and the number of subarrays, respectively, where a relationship L=M−m+1 holds. From Equation (1), the received vector $y_l(k)$ of the l-th subarray is given by Equation (4).

$$y_l(k)=[Y_l(k),y_{l+1}(k),\ldots,y_{l+M-1}(k)]^T = A_m D^{l-1}s(k)+w_l(k)$$

$$A_m=[a_m(\theta_1),a_m(\theta_2),\ldots,a_m(\theta_p)]$$

$$a_m(\theta_i)=[1,e^{j\omega_0\tau(\theta_i)},\ldots,e^{j\omega_0(m-1)\tau(\theta_i)}]^T$$

$$w_l(k)=[w_l(k),w_{l+1}(k),\ldots,w_{l-m+1}(k)]^T \quad (4)$$

where D is a diagonal matrix including $e^{j\omega_0\tau(\theta_1)}$, $e^{j\omega_0\tau(\theta_2)}$, ..., $e^{j\omega_0(m-1)\tau(\theta_p)}$ as elements, and l=1, 2, ..., L.

Furthermore, $a_m(\theta_i)$ and $A_m$ denote the response vector and matrix of the subarray, respectively. Therefore, a covariance matrix of the subarray is given by Equation (5).

$$R_l=E\{y_l(k)y_l^H(k)\}=A_m D^{l-1}R_s(D^{l-1})^H A_m^H+\sigma^2 I_m \quad (5)$$

Furthermore, a covariance matrix given in Equation (6) is obtained by spatially averaging the covariance matrices $\{R_l\}$ of the L subarrays in (5).

$$\bar{R} = \frac{1}{L}\sum_{l=1}^{L} R_l \quad (6)$$

Then the eigenvalue decomposition (EVD) of this spatially averaged covariance matrix $\bar{R}$ can be written as Equation (7).

$$\bar{R} = \sum_{i=1}^{m} \lambda_i e_i e_i^H = E\Lambda E^H \quad (7)$$

where $e_i$ and $\lambda_i$ indicate an eigenvector and an eigenvalue, respectively, E is a matrix with columns $\{e_i\}$, and $\Lambda$ is a diagonal matrix with elements $\{\lambda_i\}$. Furthermore, the spaces spanned by a signal vector $\{e_1, e_2, \ldots, e_p\}$ and a noise vector $\{e_{p+1}, e_{p+2}, \ldots, e_m\}$ are referred to as the signal subspace and the noise subspace, respectively. The signal subspace can be represented by using an array response vector. A direction-of-arrival estimation method based on the orthogonal relationship between the signal subspace and the noise subspace is called a subspace-based method.

From the eigenvalue analysis of the covariance matrix in Equation (7), an orthogonal relationship defined by Equation (8) is established between the noise vector $\{e_{p+1}, e_{p+2}, \ldots, e_m\}$ and the response vector $a_m(\theta_i)$ of the subarray belongs in the signal subspace.

$$e_k^H a_m(\theta_i)=0 \quad (8)$$

where k=p+1, ..., m. From this orthogonal relationship, a spectrum $\bar{P}_{ssmusic}(\theta)$ written as Equation (9) can be calculated.

$$\bar{P}_{ssmusic}(\theta) = \frac{1}{\sum_{k=p+1}^{m} |e_k^H a_m(\theta)|^2} \quad (9)$$

where $a_m(\theta)=[1, e^{j\omega_0\tau(\theta)}, \ldots, e^{j\omega_0(m-1)\tau(\theta)}]^T$. In the spatial smoothing based MUSIC method, the directions-of-arrival of incoming signals are estimated from the locations of the highest p peaks of the spectrum given by Equation (9).

As shown in Equation (7), the subspace-based methods (including the (spatial smoothing) MUSIC) require the EVD of the array covariance matrix to obtain the signal subspace or the noise subspace for estimating the directions-of-arrival. In some practical applications, however, particularly if the number of array elements is large, the EVD or singular value decomposition (SVD) is complicated and time-consuming when the estimation of the time-varying directions of incident signals should be carried out in a real-time manner. Therefore, applications of the subspace-based direction-of-arrival estimation methods are limited by the eigendecomposition (EVD or SVD) due to the computationally intensive eigendecomposition processing. In many cases of a practical mobile communication system, since the signals from a calling party (mobile terminal) arrive at the array antenna in a base-station via the direct path and reflection paths resulting from signal reflection at objects such as buildings, the technique for estimating the directions-of-arrival of coherent signals in a multipath propagation environment plays an important role. In the above-described direction estimation methods, however, since the desired signals cannot be distinguished from interfering signals, the directions-of-arrival of all signals must be calculated. Thus, to process many incoming waves, it is necessary to use many elements in the array antenna. This leads to an increase in size and cost associated with the array antenna. Furthermore, if the directions-of-arrival of desired signals vary over time due to, for example, the movement of the calling party (signal source), then the directions of the signals impinging on the array cannot be estimated at high speed and with high accuracy by using the ordinary subspace-based methods or the accurate reception and transmission beams cannot be formed at the base-station. This causes the performance of the receiving and transmission system at the base-station to deteriorate.

Recently, adaptive direction-of-arrival estimation and tracking methods without eigendecomposition have been studied, such as the adaptive subspace-based methods without eigendecomposition (SWEDE) (refer to, for example, A. Eriksson, P. Stoica, and T. Söderström, "On-line subspace algorithms for tracking moving sources," IEEE Trans. Signal Processing, vol. 42, no. 9, pp. 2319–2330 (1994)). These methods, however, exhibit significantly degraded performance in the case of coherent signals, low signal-to-noise ratio (SNR), or a small number of snapshots. Furthermore, the least squares (LS) technique involved in the SWEDE requires a high degree of computational complexity.

The present inventor proposed a direction-of-arrival estimation and tracking method based on the cyclostationarity of communication signals (refer to, for example, J. Xin and A. Sano, "Directions-of-arrival tracking of coherent cyclostationary signals in array processing," IEICE Trans. Fundamentals, vol. E86-A, no. 8, pp. 2037–2046 (2003)). This method using the LS technique, however, requires considerably large length of array data because it exploits a temporal property known as the cyclostationarity of incident signals.

The present inventor also proposed a direction-of-arrival estimation method called subspace-based method without eigendecomposition (SUMWE), which does not need the eigendecomposition and is computationally efficient (refer to, for example, J. Xin and A. Sano, "Computationally efficient subspace-based method for direction-of-arrival estimation without eigendecomposition," IEEE Trans. Signal Processing, vol. 52, no. 4, pp. 876–893 (2004)). This method, however, does not take into consideration the issues of online direction-of-arrival estimation and time-varying direction-of-arrival tracking.

To handle these issues of adaptive direction-of-arrival estimation and time-varying direction-of-arrival tracking, the present inventor has proposed an adaptive direction-of-arrival estimation and tracking method called the adaptive bearing estimation and tracking (ABEST) technique exploiting the computationally efficient SUMWE technique (refer to, for example, J. Xin, Y. Ohashi, and A. Sano, "Efficient subspace-based algorithms for adaptive direction estimation and tracking of narrowband signals in array processing," Proc. IFAC 8th Workshop on Adaptation and Learning in Control and Signal Processing (ALCOSP' 04), pp. 535–540, Yokohama, Japan, (2004)).

The aforementioned methods for tracking the directions-of-arrival of radio waves, however, cannot accurately track the crossing directions of coherents signals, where the trajectories of the directions of incident signals intersect with one another due to the movement of the signal source (such as a calling party).

SUMMARY OF THE INVENTION

Therefore the purpose of the present invention is to provide a new direction-of-arrival tracking method for estimating the directions of radio waves in online manner without complicated processing, such as eigendecomposition, and for quickly tracking the directions even in an environment where the trajectories of the directions of the radio waves intersect.

Here a new radio-wave direction-of-arrival tracking method is proposed for an array antenna with a plurality of antenna elements arranged in different spatial locations along a straight line at the same adjacent spacing. This proposed method includes the following steps: calculating an instantaneous correlation between array data received by some antenna elements at the sampling interval; calculating an instantaneous correlation matrix from the instantaneous correlation; estimating a noise subspace through a linear operation from the instantaneous correlation matrix; predicting the state vectors of directions with an observer at the direction updating interval; calculating the provisional estimates of the directions at the direction updating interval based on the predicted directions and the estimated noise subspace; and calculating the state vectors at the direction updating interval based on the provisional directions, the predicted state vectors, and the predicted directions to calculate estimates of the directions from the state vectors.

To accomplish the above object, according to the present invention, a direction-of-arrival tracking apparatus is provided for estimating the directions of the radio waves impinging on an array antenna with a plurality of antenna elements arranged in different spatial locations along a straight line at identical adjacent spacing. This radio-wave direction tracking apparatus includes the following elements: an instantaneous-correlation calculation unit for calculating an instantaneous correlation between some array data at the sampling interval; an instantaneous-correlation-matrix calculation unit for forming an instantaneous correlation matrix from the instantaneous correlation; a noise-subspace estimation unit for estimating a noise subspace through a linear operation from the instantaneous correlation matrix; a direction prediction unit for predicting state vectors of directions with an observer at the direction updating interval; a provisional-value calculation unit for calculating provisional estimates of the directions at the direction updating interval based on the predicted directions and the estimated noise subspace; and an estimate calculation unit for calculating the state vectors at the direction updating interval based on the provisional directions, the predicted state vectors, and the predicted directions from the state vectors.

To accomplish the above object, according to the present invention, a base-station apparatus is provided for receiving the radio waves with an array antenna having a plurality of antenna elements arranged in different spatial locations along a straight line at identical adjacent spacing. This base-station apparatus includes the following elements: the above-described direction tracking apparatus and a beam-forming section for receiving the desired signals by forming a beam with peaks oriented towards estimated directions-of-arrival.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 6 is a diagram depicting an array covariance matrix in an uncorrelated white noise environment.

FIG. 7 illustrates column elements required to estimate radio-wave directions in an instantaneous array covariance matrix.

FIG. 8 illustrates row elements required to estimate radio-wave directions in an instantaneous array covariance matrix.

FIG. 10 is a diagram depicting the formation of an instantaneous correlation matrix from elements in the first row or the last row of an instantaneous array covariance matrix and the division of the instantaneous correlation matrix into upper and lower submatrices.

DESCRIPTION OF THE PREFERRED EMBODIMENTS

Embodiments according to the present invention will now be described in detail with reference to the attached drawings.

A radio-wave direction-of-arrival tracking method according to an embodiment of the present invention will be outlined below.

The radio-wave direction-of-arrival tracking method according to the embodiment of the present invention is suitable particularly for a case where the trajectories of the directions of coherent signals cross one another due to the movement of a signal source (such as a calling party).

The current description assumes that M antenna elements constituting an array antenna receive p arriving radio waves (where M>2p). The present invention is applicable to a forward subarray, a backward subarray, and a forward and backward subarray.

Furthermore, the present invention is applicable to the tracking of incident signals including uncorrelated signals, correlated signals, and coherent (fully correlated) signals.

Figure 1:
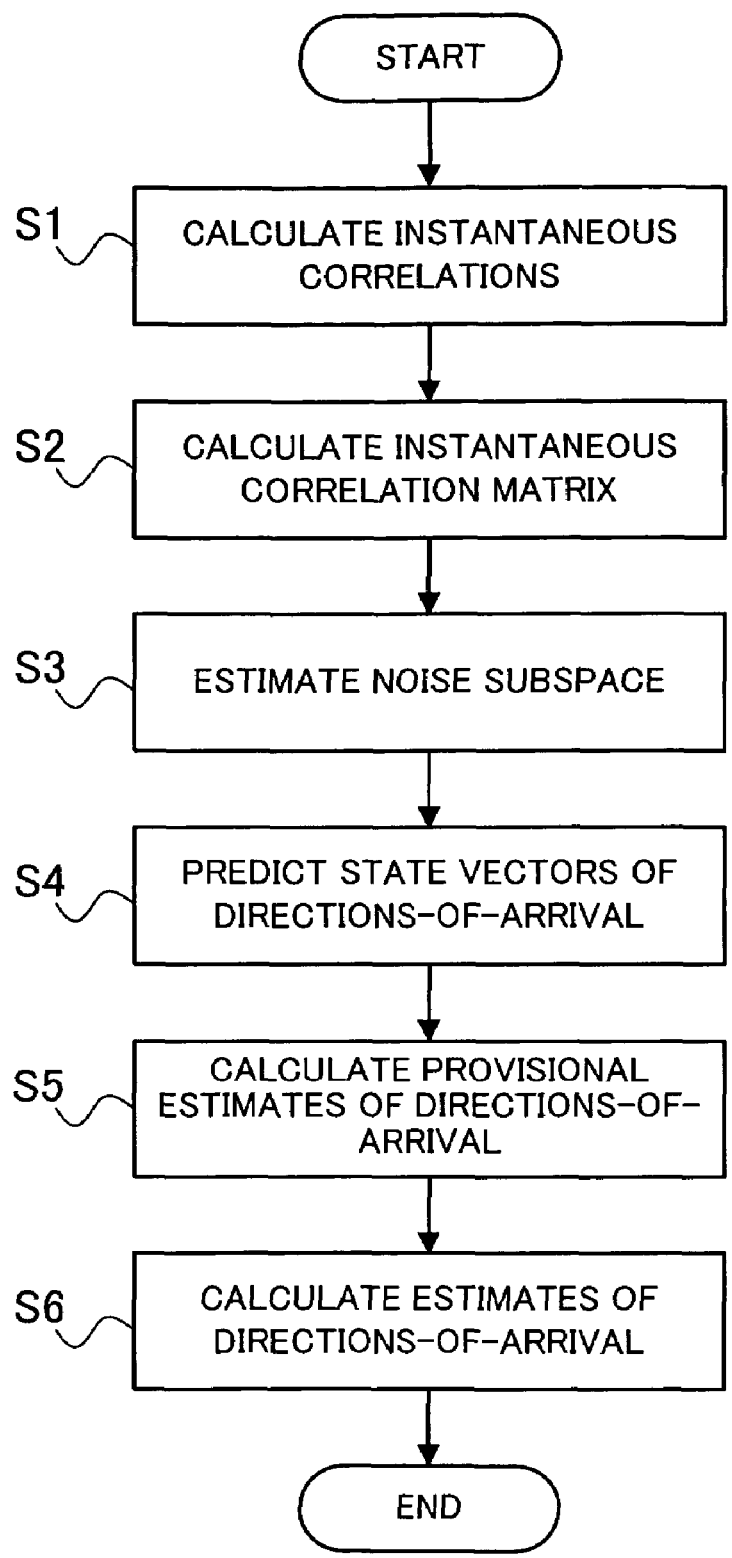
FIG. 1 is a flowchart outlining a direction tracking method according to an embodiment of the present invention.

FIG. 1 is a flowchart outlining the direction tracking method according to the embodiment of the present invention.

Figure 2:
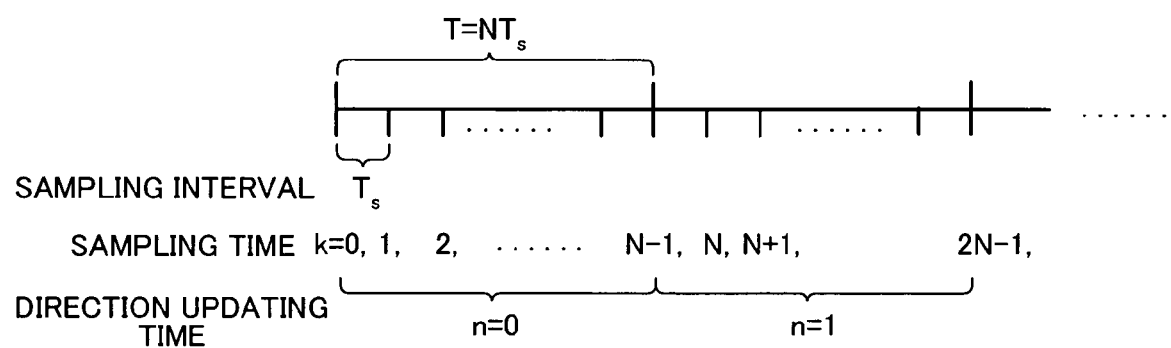
FIG. 2 is a diagram depicting the relationship between a direction updating interval and a sampling interval.

FIG. 2 is a diagram depicting the relationship between a direction updating interval and a sampling interval.

It is assumed that directions change over time more slowly compared with a sampling interval $T_s$ and that a direction updating interval (namely, an interval at which the calculation of the directions-of-arrival is renewed) T is written as $T=NT_s$, where N is the number of snapshots during the period T. It is also assumed that the relationship between a sampling time k and a direction updating time n is written as k=nN, nN+1, . . . , (n+1)N−1.

Steps of the direction tracking method according to the embodiment shown in FIG. 1 are as follows. First, the N snapshots during the direction updating interval T are used to calculate the instantaneous correlation between the array data of some antenna elements at the sampling time k (step S1).

Then, one to four Hankel correlation matrices, which are instantaneous correlation matrices, are formed from the instantaneous correlation at the sampling time k (where the sampling rate is $1/T_s$) (step S2).

Thereafter, from the instantaneous correlation matrices formed in step S2, a noise subspace at the sampling time k is estimated through a linear operation using an adaptive algorithm, such as the least-square-mean (LMS) method or the normalized least-square-mean (NLMS) method employing a fixed or time-varying step-size (step S3).

Furthermore, the state vectors of the directions at the current direction updating time n are predicted with an observer by using the state vectors of the directions (each composed of the direction-of-arrival and the angular velocity and acceleration of the direction) at the previous direction updating time n−1 (step S4).

Provisional estimates of the directions of the signals at the current direction updating time n are calculated through an adaptive algorithm, such as the approximate Newton method, based on predicted directions obtained from the predicted state vectors and the noise subspace obtained at the sampling time k=(n+1)N−1 (step S5).

Furthermore, the state vectors at the current direction updating time n are calculated based on the provisional estimates, the predicted state vectors, and the predicted direction, and then estimates of the directions are calculated from the calculated state vectors (step S6).

With the above-described direction tracking method according to this embodiment, the directions can be tracked accurately without increasing the computational load even in an environment where trajectories of the directions of coherent signals intersect with one another due to the movement of the signal source (such as a calling party).

The processing in step S4 may be carried out at any time as long as it is carried out before the processing in step S5.

The current embodiment will be described in detail below.

Figure 3:
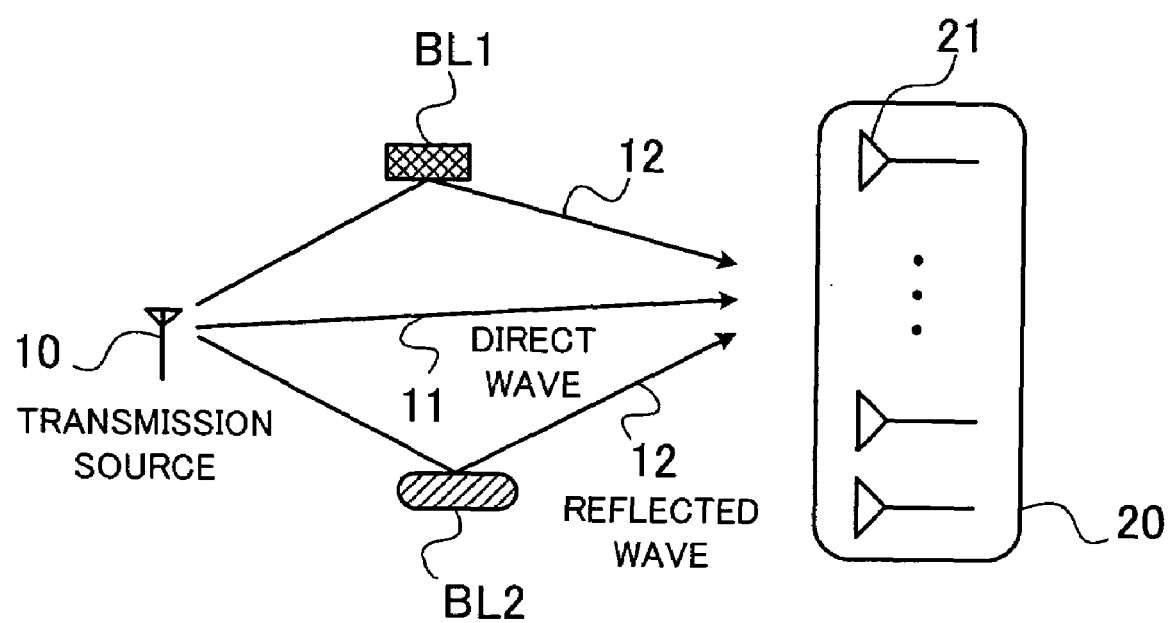
FIG. 3 is a diagram depicting the arrangement of an array antenna and a transmission source.

FIG. 3 is a diagram depicting the arrangement of a transmission source and an array antenna.

A direct wave 11 is a radio wave that impinges directly on an array antenna 20 of a base-station from a transmission source 10. Reflected waves 12 impinge upon the base-station after being reflected at objects such as buildings BL1 and BL2. Although only two reflected waves 12 are shown in FIG. 3, the current description assumes that a total of p waves including the direct wave 11 and reflected waves 12 are emitted from the transmission source 10. It is also assumed that the number of incident signals p is known. The relationship between the direct wave 11 and the reflected waves 12 at a certain sampling time k is written as Equation (10).

$$s_i(k)=\beta_i s_1(k) \tag{10}$$

where $\beta_i$ indicates a multipath coefficient representing the complex damping of the reflected wave $s_i(k)$ with respect to the direct wave $s_1(k)$. Here, $\beta_i \neq 0$ and $\beta_1=1$.

Figure 4:
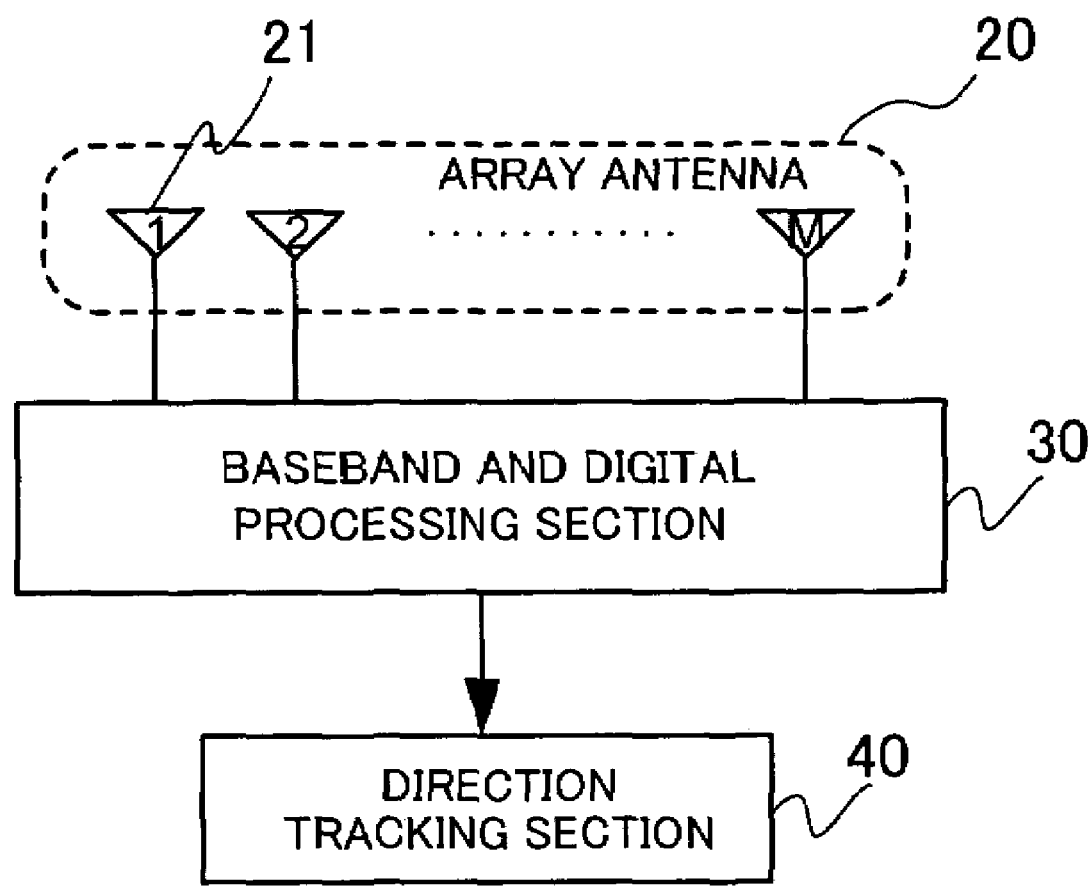
FIG. 4 is a diagram depicting the structure of a radio-wave direction estimation system.

FIG. 4 is a diagram depicting the structure of a direction estimation system.

The direction estimation system includes an array antenna 20, a baseband and digital processing section 30 for performing baseband processing and digital signal processing, and a direction tracking section 40 for performing direction tracking processing according to this embodiment.

The array antenna 20 includes M antenna elements 21. Here, a condition M>2p needs to be satisfied, where p is the number of radio waves (direct wave plus reflected waves) impinging upon the array antenna 20.

Figure 5:
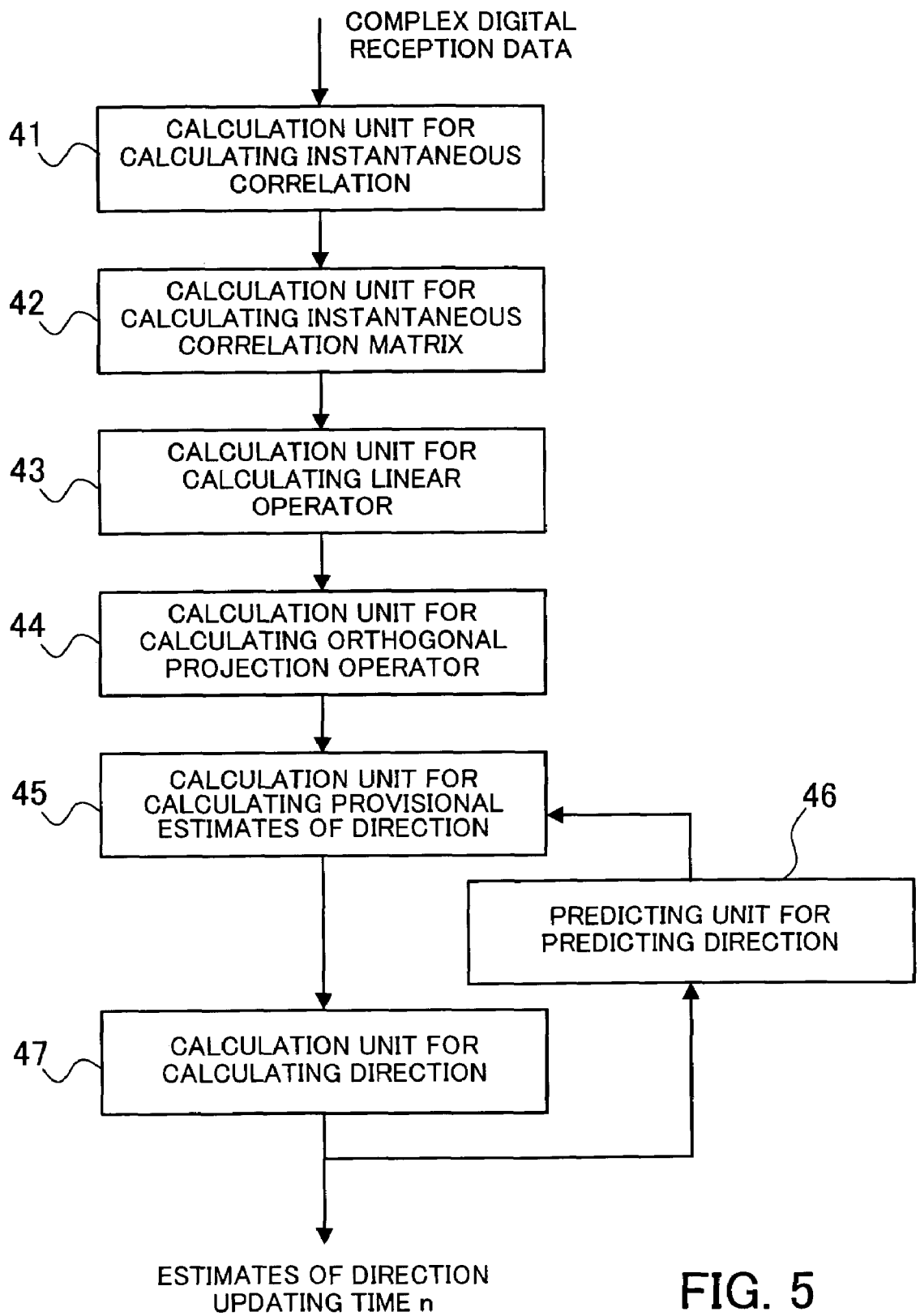
FIG. 5 is a block diagram depicting the structure of a radio-wave direction tracking section shown in FIG. 4.

FIG. 5 is a block diagram depicting the structure of the direction tracking section 40.

The direction tracking section 40 includes a calculation unit 41 for calculating an instantaneous correlation, a calculation unit 42 for calculating an instantaneous correlation matrix, a calculation unit 43 for calculating a linear operator, a calculation unit 44 for calculating an orthogonal projection operator, a calculation unit 45 for calculating a provisional estimate of the direction, a predicting unit 46 for predicting a direction with an observer, and a calculation unit 47 for calculating a direction with an observer.

The direction tracking will be described in detail.

First, the predicting unit 46 for predicting a direction with an observer predicts state vectors of the directions at the direction updating time n with the observer, as given by Equation (11), by using the state vectors $\hat{X}_i(n-1|n-1)$ of the directions at the previous direction updating time (n−1).

$$\hat{x}_i(n|n-1)=F\hat{x}_i(n-1|n-1),\ \hat{\theta}_i(n|n-1)=c^T\hat{x}_i(n|n-1) \tag{11}$$

where $x_i(n) \triangleq [\theta_i(n),\ \dot{\theta}_i(n),\ \ddot{\theta}_i(n)]^T$ denotes state vectors of directions $\theta_i(n),\ \dot{\theta}_i(n)$ and $\ddot{\theta}_i(n)$ are the angular velocity and acceleration of the directions $\theta_i(n)$. F and c are a transposed matrix and an observation vector, which are defined as follows, respectively.

$$F \triangleq \begin{bmatrix} 1 & T & 0.5T^2 \\ 0 & 1 & T \\ 0 & 0 & 1 \end{bmatrix}, c \triangleq [1, 0, 0]^T$$

This processing corresponds to the processing in step S4 of FIG. 1.

Next, from the received data of the antenna elements, the calculation unit 41 for calculating an instantaneous correlation produces a received signal vector y(k) as given by Equation (1) based on the N snapshots $\{y_1(k), y_2(k), \ldots, y^M(k)\}_{k=nN}^{(n+1)N-1}$ of the complex digital signal obtained from the baseband and digital processing section 30. Furthermore, $\phi(k)$ and $\bar{\phi}(k)$, which are correlation vectors between signals y(k) and $y^*_M(k)$ and between signals y(k) and $y^*_1(k)$ at the sampling time k, are generated based on Equations (12a) and (12b).

$$\phi(k)=y(k)y_M^*(k) \qquad (12a)$$

$$\bar{\phi}(k)=y(k)y_1^*(k) \qquad (12b)$$

In general, when the directions are estimated from the signals received by the array antenna 20, an array covariance matrix R whose elements are calculated correlations $r_{11}$ to $r_{MM}$ between the received signals in the signal vector y(k) (=$y_1(k), Y_2(k), \ldots, y_M(k)$) of the antenna elements 21 is used. This array covariance matrix R is given in an uncorrelated white noise environment as shown in FIG. 6, where $y^H(k)$ indicates the complex conjugate transposition of the received signal vector y(k)

FIG. 6 is a diagram depicting the array covariance matrix R in an uncorrelated white noise environment.

Furthermore, the following equations hold:

$$y_i(k)=x_i(k)+w_i(k),$$

$$E[w_i(k)w_j^*(k)]=\sigma^2(i=j),$$

$$E[w_i(k)w_j^*(k)]=0(i \neq j)$$

where $x_i(k)$ indicates a noise-free received signal and $w_j(k)$ indicates uncorrelated white noise. In short, in an uncorrelated white noise environment, the diagonal elements $r_{11}$, $r_{22}, \ldots, r_{MM}$ of the array covariance matrix R contain noise.

FIG. 7 illustrates column elements required to estimate the directions in an instantaneous array covariance matrix R(k).

FIG. 8 illustrates row elements required to estimate directions in the instantaneous array covariance matrix R(k).

In order to estimate the directions-of-arrival, since the instantaneous array covariance matrix R(k) has conjugate symmetry, it is sufficient to calculate for the first column and the last column, that is, the M-th column, shown in FIG. 7, or for the first row and the last row, that is, the M-th row, shown in FIG. 8. More specifically, it is sufficient to calculate only the correlations between the received data of the M-th antenna element and the received data of the first, second, ..., (M-1)-th antenna elements based on Equation (12a), or the correlations between the received data of the first antenna element and the received data of the second, third, ..., M-th antenna elements based on Equation (12b). A case where both Equations (12a) and (12b) are used is described below.

Referring back to FIG. 5, the calculation unit 42 for calculating an instantaneous correlation matrix uses the correlation vectors obtained from Equations (12a) and (12b) to calculate (M-p)×p Hankel correlation matrices, given by Equation (13), which are instantaneous correlation matrices at the sampling time k.

$$\Phi_f(k)=\text{Hank}\{h_c, h_r\}, \bar{\Phi}_f(k)=\text{Hank}\{\bar{h}_c, \bar{h}_r\}$$

$$\Phi_b(k)=J_{M-p}\Phi_f^*(k)J_p, \bar{\Phi}_b(k)=J_{M-p}\bar{\Phi}_f^*(k)J_p \qquad (13)$$

where $h_c=[\hat{r}_{1M}(k), \hat{r}_{2M}(k), \ldots, \hat{r}_{M-p,M}(k)]^T$, $h_r=[\hat{r}_{M-p,M}(k), \hat{r}_{M-p+1,M}(k), \ldots, \hat{r}_{M-1,M}(k)]^T$, $\bar{h}_c=[\hat{r}_{21}(k), \hat{r}_{31}(k), \ldots, \hat{r}_{L1}(k)]^T$, $\bar{h}_r=[\hat{r}_{L1}(k), \hat{r}_{L+1,1}(k), \ldots, \hat{r}_{M1}(k)]^T$, L=M-p+1, and $J_m$ is an m×m inverse matrix.

Furthermore, the calculation unit 42 for calculating an instantaneous correlation matrix divides each of the (M-p)×p Hankel correlation matrices into upper and lower parts, as given by Equation (14).

$$\Phi_f(k) \triangleq \begin{bmatrix} \Phi_{1f}(k) \\ \Phi_{2f}(k) \end{bmatrix} \begin{matrix} \} p \\ \} M-2p \end{matrix}, \qquad (14)$$

$$\bar{\Phi}_f(k) \triangleq \begin{bmatrix} \bar{\Phi}_{1f}(k) \\ \bar{\Phi}_{2f}(k) \end{bmatrix} \begin{matrix} \} p \\ \} M-2p \end{matrix}$$

$$\Phi_b(k) \triangleq \begin{bmatrix} \Phi_{1b}(k) \\ \Phi_{2b}(k) \end{bmatrix} \begin{matrix} \} p \\ \} M-2p \end{matrix},$$

$$\bar{\Phi}_b(k) \triangleq \begin{bmatrix} \bar{\Phi}_{1b}(k) \\ \bar{\Phi}_{2b}(k) \end{bmatrix} \begin{matrix} \} p \\ \} M-2p \end{matrix}$$

Equations (12a), (12b), (13), and (14) will be described in more detail.

The calculation unit 41 for calculating an instantaneous correlation obtains the instantaneous correlations $r_{1M}(k)$, $r_{2M}(k), \ldots, r_{M-1,M}(k)$ (refer to the last column in FIG. 7) between the received data of the M-th antenna element 21 of the array antenna 20 and the received data of the first, second, ..., (M-1)-th antenna elements at the sampling time k by performing the calculation of Equation (12a). The calculation unit 42 for calculating an instantaneous correlation matrix obtains a Hankel correlation matrix $\Phi_f(k)$ by performing the calculation of Equation (13), as shown in FIG. 9, and then divides this instantaneous correlation matrix into upper and lower parts.

Figure 9:
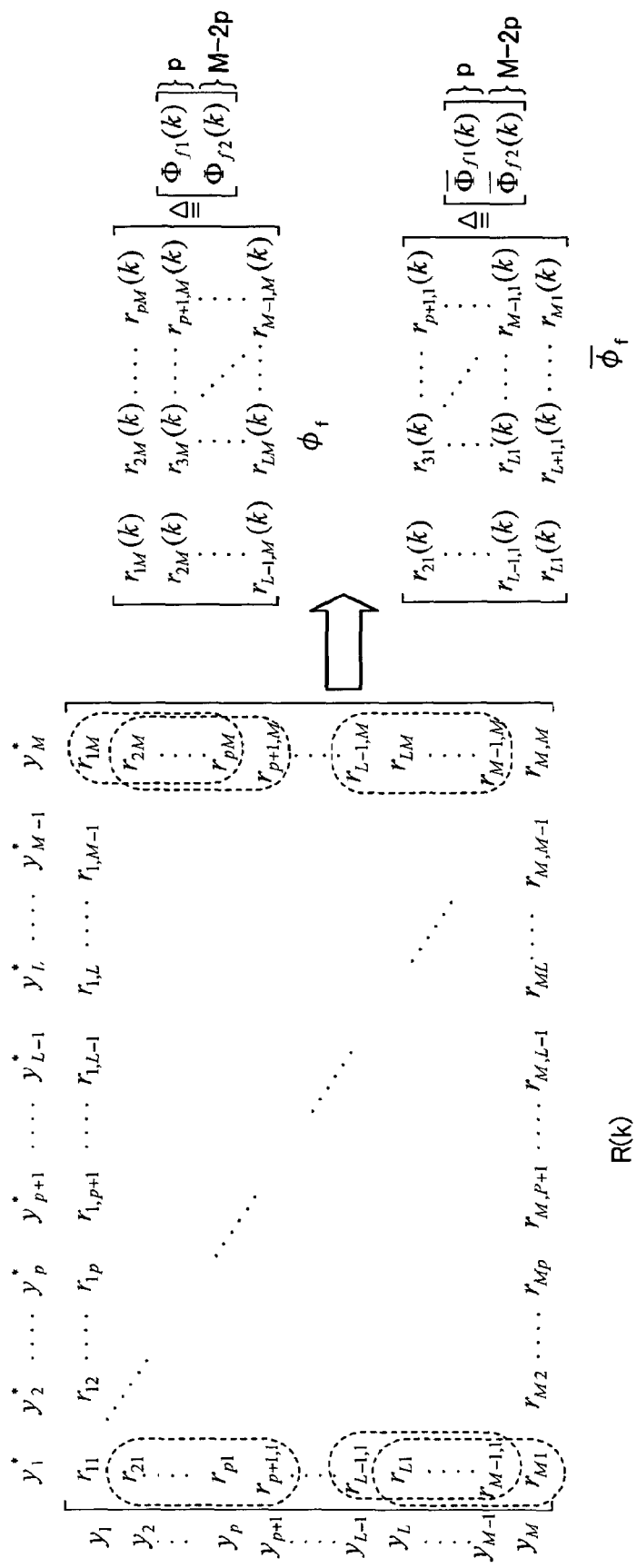
FIG. 9 is a diagram depicting the formation of an instantaneous correlation matrix from elements in the first column or the last column of an instantaneous array covariance matrix and the division of the instantaneous correlation matrix into upper and lower submatrices.

FIG. 9 is a diagram depicting the generation of an instantaneous correlation matrix from the elements in the first column or the last column of the instantaneous array covariance matrix R(k) and the division of the instantaneous correlation matrix into upper and lower submatrices.

The calculation unit 42 for calculating an instantaneous correlation matrix takes (M-p) sets of instantaneous correlations from among (M-1) instantaneous correlations in the last column of the calculated instantaneous array covariance matrix R(k) shown in FIG. 9, each set containing the same number of instantaneous correlations as the number of signals (=p), one set at a time while shifting the taking-out position downward by one instantaneous correlation. The calculation unit 42 then arranges the taken instantaneous correlations along the rows in order starting from the first row to produce the (M-p)×p instantaneous correlation matrix $\Phi_f(k)$. Thereafter, the calculation unit 42 divides $\Phi_f(k)$ into two submatrices: the upper one as a p×p matrix $\Phi_{f1}(k)$ and the lower as a (M-2p)×p matrix $\Phi_{f2}(k)$ shown in Equation (14).

Similarly, the calculation unit 41 for calculating an instantaneous correlation obtains instantaneous correlations $r_{21}(k)$, $r_{31}(k), \ldots, r_{M1}(k)$ (refer to the first column in FIG. 7) between the received data of the first antenna element 21 of the array antenna 20 and the received data of the second, third, ..., M-th antenna elements at the sampling time k by performing the calculation of Equation (12b). The calculation unit 42 for calculating an instantaneous correlation matrix performs the calculation of Equation (13) to take (M−p) sets of instantaneous correlations from among (M−1) instantaneous correlations in the first column of the instantaneous array covariance matrix R(k) shown in FIG. 9, each set containing the same number of instantaneous correlations as the number of signals (=p), one set at a time while shifting the taking-out position downward by one instantaneous correlation. The calculation unit 42 then arranges the taken instantaneous correlations along the rows in order starting from the first row to produce the (M−p)×p instantaneous correlation matrix $\overline{\Phi}_f(k)$. Thereafter, the calculation unit 42 divides $\overline{\Phi}_f(k)$ into two submatrices: the upper one as a p×p matrix $\overline{\Phi}_{f1}(k)$ and the lower as a (M−2p)×p matrix $\overline{\Phi}_{f2}(k)$ shown in Equation (14).

The above-described processing is also performed for the rows of the instantaneous array covariance matrix R(k). More specifically, the calculation unit 41 for calculating an instantaneous correlation obtains instantaneous correlations $r_{12}(k), r_{13}(k), \ldots, r_{1M}(k)$ (refer to the first row in FIG. 8) between the received data of the first antenna element 21 of the array antenna 20 and the received data of the second, third, ..., M-th antenna elements at the sampling time k by performing the calculation of Equation (12b). The calculation unit 42 for calculating an instantaneous correlation matrix obtains a Hankel correlation matrix (instantaneous correlation matrix) $\Phi_b(k)$ by performing the calculation of Equation (13), as shown in FIG. 10, and then divides this instantaneous correlation matrix into upper and lower parts.

Figure 10:
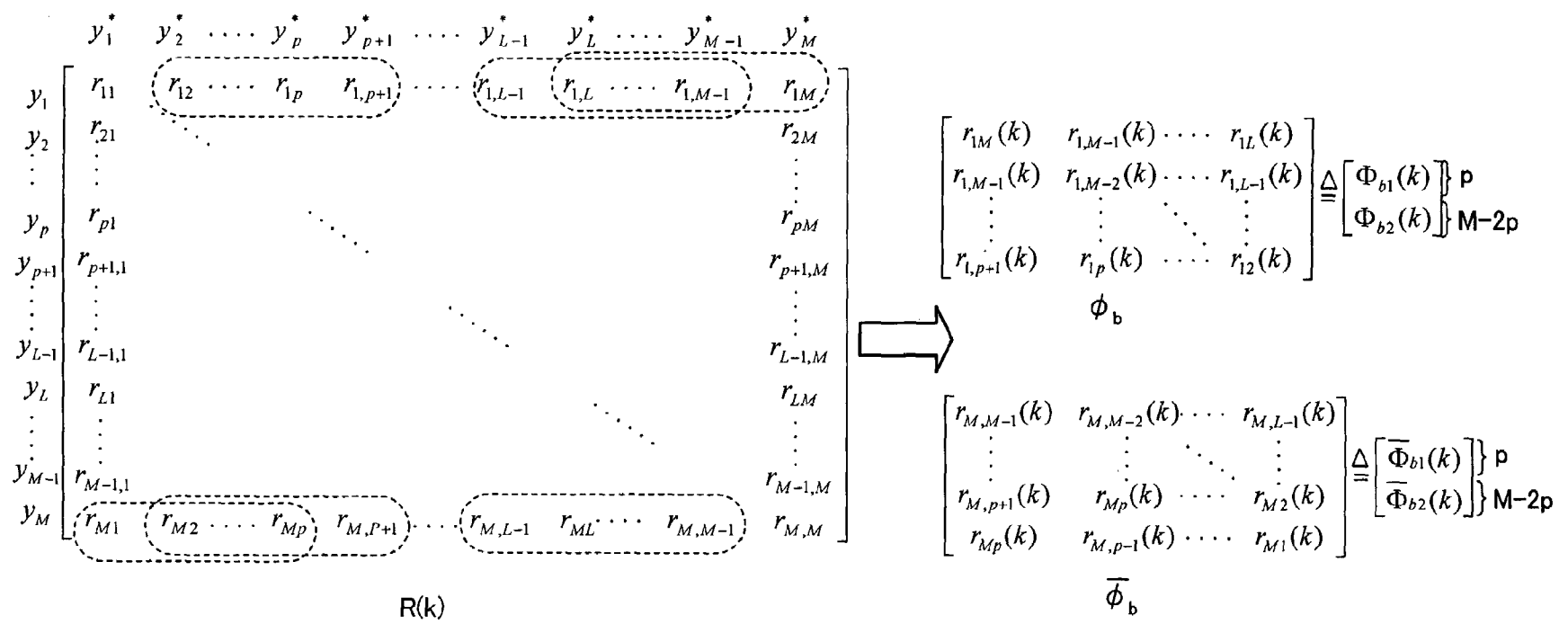

FIG. 10 is a diagram depicting the generation of an instantaneous correlation matrix from the elements in the first row or the last row of the instantaneous array covariance matrix R(k) and the division of the instantaneous correlation matrix into upper and lower submatrices.

The calculation unit 42 for calculating an instantaneous correlation matrix takes (M−p) sets of instantaneous correlations from among (M−1) instantaneous correlations in the first row of the instantaneous array covariance matrix R(k) shown in FIG. 10, each set containing the same number of instantaneous correlations as the number of signals (=p), one set at a time while shifting the taking-out position from right to left by one instantaneous correlation. The calculation unit 42 then arranges the taken instantaneous correlations along the rows in order starting from the first row to produce the (M−p)×p instantaneous correlation matrix $\Phi_b(k)$. Thereafter, the calculation unit 42 divides $\Phi_b(k)$ into two submatrices: the upper one as a p×p matrix $\Phi_{b1}(k)$ and the lower as a (M−2p)×p matrix $\Phi_{b2}(k)$ shown in Equation (14).

Similarly, the calculation unit 41 for calculating an instantaneous correlation obtains instantaneous correlations $r_{M1}(k), r_{M2}(k), \ldots, r_{M,M-1}(k)$ (refer to the last row in FIG. 8) between the received data of the M-th antenna element 21 of the array antenna 20 and the received data of the first, second, ..., (M−1)-th antenna elements at the sampling time k by performing the calculation of Equation (12a). The calculation unit 42 for calculating an instantaneous correlation matrix then performs the calculation of Equation (13) to take (M−p) sets of instantaneous correlations from among (M−1) instantaneous correlations in the last row of the instantaneous array covariance matrix R(k) shown in FIG. 10, each set containing the same number of instantaneous correlations as the number of signals (=p), one set at a time while shifting the taking-out position from right to left by one instantaneous correlation. The calculation unit 42 then arranges the taken instantaneous correlations along the rows in order starting from the first row to produce the (M−p)×p instantaneous correlation matrix $\overline{\Phi}_b(k)$ Thereafter, the calculation unit 42 divides $\overline{\Phi}_b(k)$ into two submatrices: the upper one as a p×p matrix $\overline{\Phi}_{b1}(k)$ and the lower as a (M−2p)×p matrix $\overline{\Phi}_{b2}(k)$ shown in Equation (14).

In this manner, four Hankel correlation matrices and their eight divided submatrices are generated.

The processing of estimating the noise subspace will be described next. The calculation unit 43 for calculating a linear operator uses the eight matrices shown in Equation (14) to generate two matrices $\Phi_1(k)$ and $\Phi_2(k)$ written as Equation (15), to calculate an estimate error matrix E(k) written as Equation (16).

$$\Phi_1(k) \triangleq [\Phi_{f1}(k), \overline{\Phi}_{f1}(k), \Phi_{b1}(k), \overline{\Phi}_{b1}(k)]$$

$$\Phi_2(k) \triangleq [\Phi_{f2}(k), \overline{\Phi}_{f2}(k), \Phi_{b2}(k), \overline{\Phi}_{b2}(k)] \quad (15)$$

$$E(k) \triangleq \Phi_2^H(k) - \Phi_1^H(k)P(k-1) \quad (16)$$

The calculation unit 43 for calculating a linear operator then obtains a linear operator P(k) given by Equation (17) using the IMS algorithm.

$$P(k) = P(k-1) + \mu \Phi_1(k) E(k) \quad (17)$$

where μ denotes a step size and is a positive value that satisfies a conditional expression $0 < \mu < 2/\text{tr}\{\Psi_1\}$. Here, $\Psi_1 \triangleq E\{\Phi_1(k)\Phi_1^H(k)\}$ and $\text{tr}\{\bullet\}$ is a trace operation.

Next, the calculation unit 44 for calculating an orthogonal projection operator performs QR decomposition written as Equation (18) by using P(k) obtained from Equation (17).

$$P(k)P^H(k) + I_p \triangleq \overline{P} = \overline{Q}\overline{R} \quad (18)$$

Furthermore, an orthogonal projection operator Π(k) is obtained from Equation (19) to estimate the noise subspace.

$$\Pi(k) = Q(k)(I_{M-2p} - P^H(k)\overline{R}^{-1}\overline{Q}^H P(k))Q^H(k) \quad (19)$$

Next, the calculation unit 45 for calculating a provisional estimate of the direction uses the predicted directions $\hat{\theta}_i(n|n-1)$ obtained from Equation (11) and $\Pi(n) = \Pi(k)|_{k=(n+1)N-1}$ obtained from Equation (19) to calculate, based on Equation (20), provisional estimates $\tilde{\theta}_i(n)$ of the directions-of-arrival at the sampling time k=(n+1)N−1 (namely, direction updating time n) by the approximate Newton method.

$$\tilde{\theta}_i(n) = \hat{\theta}_i(n|n-1) - \frac{Re\{\overline{d}^H(\theta)\prod(n)\overline{a}(\theta)\}}{\overline{d}^H(\theta)\Pi(n)\overline{d}(\theta)}\bigg|_{\theta=\hat{\theta}_i(n|n-1)} \quad (20)$$

where $$\overline{d}(\theta) = j\omega_0(d/c)\cos\theta_k[0, e^{j\omega_0\tau(\theta)}, 2e^{j2\omega_0\tau(\theta)}, \ldots, (L-2)e^{j\omega_0(L-2)\tau(\theta)}]^T.$$

Finally, the calculation unit 47 for calculating a direction-of-arrival with an observer calculates the state vectors of the directions-of-arrival at the direction updating time n with the observer based on Equation (21) to give estimates $\hat{\theta}_i(n|n)$ of the directions-of-arrival by using the provisional estimates $\tilde{\theta}_i(n)$ of the directions obtained from Equation (20) and $\hat{x}_i(n|n-1)$ and $\hat{\theta}_i(n|n-1)$ obtained from Equation (11).

$$\hat{x}_i(n|n) = \hat{x}_i(n|n-1) + g_i(\tilde{\theta}_i(n) - \hat{\theta}_i(n|n-1)), \hat{\theta}_i(n|n) = c^T \hat{x}_i(n|n) \quad (21)$$

where $g_i$ denotes observer gains. It is noted that the observer gains $g_i$ are set such that all eigenvalues of $F-g_iC^T$ are arranged in a unit circle.

As described above, the direction tracking section 40 can track the directions-of-arrival of signals online through the LMS algorithm with a certain fixed step-size $\mu$ and the approximate Newton method. In addition, the directions can be estimated accurately without having to increase the computational load even in an environment where trajectories of the directions-of-arrival of direct waves and reflected waves intersect with one another due to the movement of the signal source (such as a calling party).

In the above-described embodiment, four Hankel correlation matrices $\Phi_f(k), \overline{\Phi}_f(k), \Phi_b(k), \overline{\Phi}_b(k)$ are obtained, and the Hankel correlation matrices are each divided into two submatrices $\Phi_{f1}(k), \Phi_{f2}(k); \overline{\Phi}_{f1}(k), \overline{\Phi}_{f2}(k); \Phi_{b1}(k), \Phi_{b2}(k); \overline{\Phi}_{b1}(k), \overline{\Phi}_{b2}(k)$ to determine the two matrices $\Phi_1(k)$ and $\Phi_2(k)$. In order to estimate the directions-of-arrival, however, since the array covariance matrix R has conjugate symmetry, it is sufficient to use instantaneous correlations in the first column or the last column shown in FIG. 7, instantaneous correlations in the first row or the last row shown in FIG. 8, or instantaneous correlations in any two or more rows or columns. In short, it is sufficient to use any one to four of the four Hankel correlation matrices to determine the matrices $\Phi_1(k)$ and $\Phi_2(k)$.

For example, if any one of the four Hankel correlation matrices is to be used, the matrices $\Phi_1(k)$ and $\Phi_2(k)$ are determined from any of Equations (22a) to (22d).

$$\Phi_1(k)=\Phi_{f1}(k), \Phi_2(k)=\Phi_{f2}(k) \quad (22a)$$

$$\Phi_1(k)=\overline{\Phi}_{f1}(k), \Phi_2(k)=\overline{\Phi}_{f2}(k) \quad (22b)$$

$$\Phi_1(k)=\Phi_{b1}(k), \Phi_2(k)=\Phi_{b2}(k) \quad (22c)$$

$$\Phi_1(k)=\overline{\Phi}_{b1}(k), \Phi_2(k)=\overline{\Phi}_{b2}(k) \quad (22d)$$

If any two of the four Hankel correlation matrices are to be used, the matrices $\Phi_1(k)$ and $\Phi_2(k)$ are determined from any of Equations (23a) to (23f).

$$\Phi_1(k)=[\Phi_{f1}(k), \overline{\Phi}_{f1}(k)], \Phi_2(k)=[\Phi_{f2}(k), \overline{\Phi}_{f2}(k)] \quad (23a)$$

$$\Phi_1(k)=[\Phi_{f1}(k), \Phi_{b1}(k)], \Phi_2(k)=[\Phi_{f2}(k), \Phi_{b2}(k)] \quad (23b)$$

$$\Phi_1(k)=[\Phi_{f1}(k), \overline{\Phi}_{b1}(k)], \Phi_2(k)=[\Phi_{f2}(k), \overline{\Phi}_{b2}(k)] \quad (23c)$$

$$\Phi_1(k)=[\overline{\Phi}_{f1}(k), \Phi_{b1}(k)], \Phi_2(k)=[\overline{\Phi}_{f2}(k), \Phi_{b2}(k)] \quad (23d)$$

$$\Phi_1(k)=[\overline{\Phi}_{f1}(k), \overline{\Phi}_{b1}(k)], \Phi_2(k)=[\overline{\Phi}_{f2}(k), \overline{\Phi}_{b2}(k)] \quad (23e)$$

$$\Phi_1(k)=[\Phi_{b1}(k), \overline{\Phi}_{b1}(k)], \Phi_2(k)=[\Phi_{b2}(k), \overline{\Phi}_{b2}(k)] \quad (23a)$$

If any three of the four Hankel correlation matrices are to be used, the matrices $\Phi_1(k)$ and $\Phi_2(k)$ are determined from any of Equations (24a) to (24d).

$$\Phi_1(k)=[\Phi_{f1}(k), \overline{\Phi}_{f1}(k), \Phi_{b1}(k)], \Phi_2(k)=[\Phi_{f2}(k), \overline{\Phi}_{f2}(k), \Phi_{b2}(k)] \quad (24a)$$

$$\Phi_1(k)=[\Phi_{f1}(k), \overline{\Phi}_{f1}(k), \overline{\Phi}_{b1}(k)], \Phi_2(k)=[\Phi_{f2}(k), \overline{\Phi}_{f2}(k), \overline{\Phi}_{b2}(k)] \quad (24b)$$

$$\Phi_1(k)=[\Phi_{f1}(k), \Phi_{b1}(k), \overline{\Phi}_{b1}(k)], \Phi_2(k)=[\Phi_{f2}(k), \Phi_{b2}(k), \overline{\Phi}_{b2}(k)] \quad (24c)$$

$$\Phi_1(k)=[\overline{\Phi}_{f1}(k), \Phi_{b1}(k), \overline{\Phi}_{b1}(k)], \Phi_2(k)=[\overline{\Phi}_{f2}(k), \Phi_{b2}(k), \overline{\Phi}_{b2}(k)] \quad (24d)$$

A case with the four Hankel correlation matrices has already been described.

In addition, although, in the above-described embodiment, the linear operator P(k) is obtained from Equation (17) through the LMS algorithm with a certain fixed step-size $\mu$, the step-size $\mu$ may be variable over time. More specifically, an LMS algorithm with a time-varying step-size $\mu$ can be obtained by determining the step-size $\mu$ in Equation (17) based on Equation (25) so that the step-size $\mu$ is variable according to the instantaneous correlation matrix $\Phi_1(k)$ at the sampling time k.

$$\mu=2/tr\{\Phi_1(k)\Phi_1^H(k)\} \quad (25)$$

Furthermore, instead of the LMS algorithm, the linear operator P(k) may be calculated through the NLMS algorithm written as Equation (26).

$$P(k)=P(k-1)+\overline{\mu}\tilde{R}^{-1}\tilde{Q}^H\Phi_1(k)E(k) \quad (26)$$

where $\tilde{Q}$ and $\tilde{R}$ are obtained through $\Phi_1(k)\Phi_1^H(k)=\tilde{Q}\tilde{R}$, which denotes QR decomposition of $\Phi_1(k) \Phi_1^H(k)$. Here, the step-size $\overline{\mu}$ for the NIMS technique should satisfy a stable condition $0<\overline{\mu}<2$.

Simulation results of the direction tracking method according to this embodiment are described below.

Figure 11:
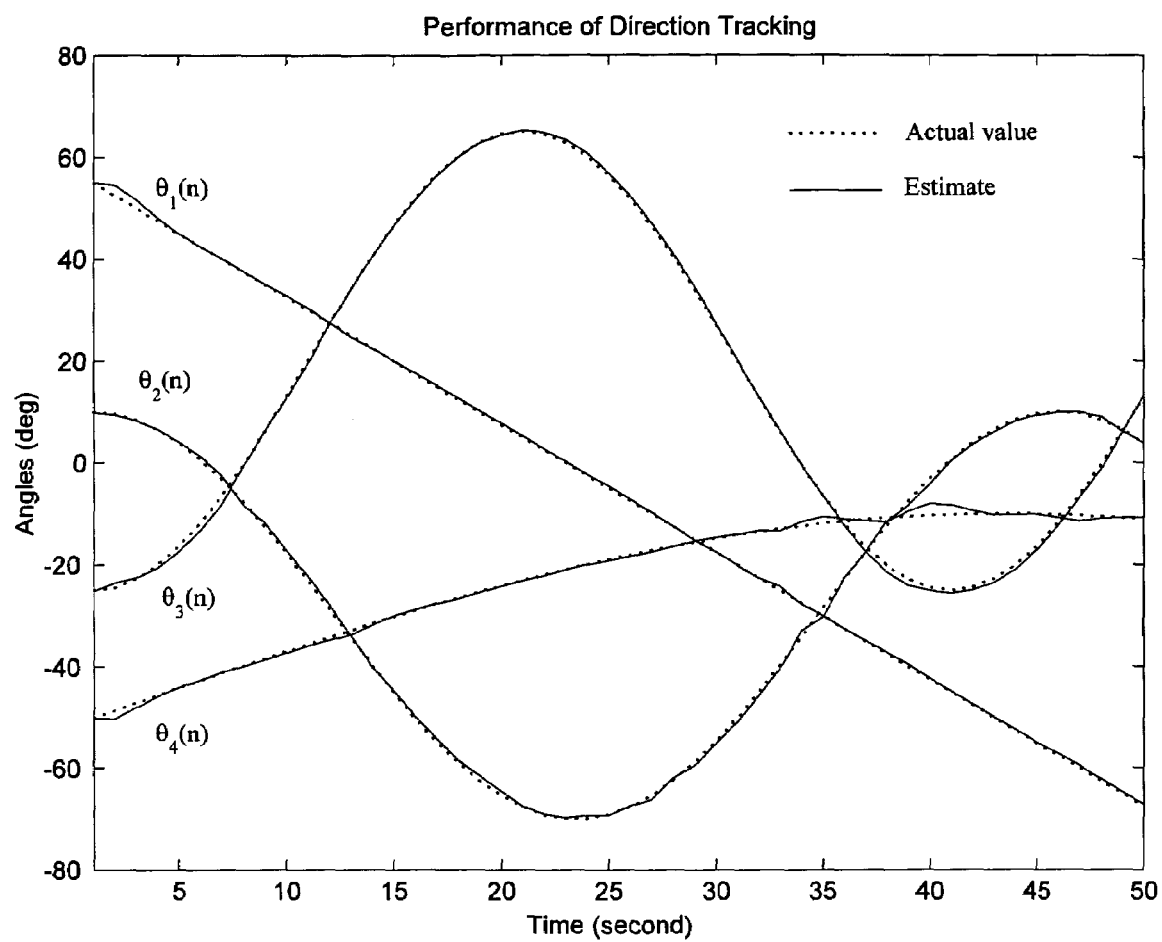
FIG. 11 is a graph depicting simulation results of estimates of directions-of-arrival.

FIG. 11 is a graph depicting simulation results of estimates of directions-of-arrival.

In the graph of FIG. 11, the vertical axis corresponds to angle and the horizontal axis corresponds to time index. In the graph, dotted lines represent the actual directions-of-arrival of received signals, whereas solid lines represent plots of estimates.

The number of elements in the uniform linear array (ULA) was M=9. Four coherent signals were incident upon the array antenna from the angles of $\theta_1(n), \theta_2(n), \theta_3(n)$, and $\theta_4(n)$ with the SNRs of 15 dB, 10 dB, 13 dB, and 13 dB. N (=100) snapshots were observed during the direction updating interval T=1 s and the orthogonal projection operator $\Pi(n)=\Pi(k)_{k=(n+1)N-1}$ at the direction updating time n was calculated through the NLMS algorithm in Equation (26) to obtain estimates $\hat{\theta}_1(n), \hat{\theta}_2(n), \hat{\theta}_3(n), \hat{\theta}_4(n)$ of the directions-of-arrival from Equation (20). In this example, the step-size of the NIMS method was $\overline{\mu}=0.88$. The estimates obtained through 100 arithmetic operations were plotted as shown in FIG. 11, which indicates that the estimates accurately follow the actual directions-of-arrival even though the trajectories of the directions-of-arrival of the incident signals intersect with one another. As demonstrated above, the direction tracking method according to this embodiment can estimate the directions-of-arrival of time-varying, fully correlated signals (coherent signals) quickly and accurately without the complicated eigendecomposition, even if the directions-of-arrival intersect with one another.

Although, in the above-described embodiment, a direction tracking method in an uncorrelated white noise environment has been described, the present invention can also be applied to a spatially correlated noise environment. In a spatially correlated noise environment, however, the following procedure needs to be followed to generate an instantaneous correlation matrix.

In a spatially correlated noise environment, instead of the (M−p)×p Hankel correlation matrices obtained from Equation (13), Hankel correlation matrices need to be generated based on Equation (27), where $\overline{q}$ denotes the length of spatial correlation of noise (namely, $E\{w_i(n)w^*_{i+k}(n)\}=0$ if $|k|>\overline{q}$).

More specifically, in a spatially correlated noise environment, (M−p−$\overline{q}$)×p Hankel correlation matrices at the sampling time k, written as Equation (27), can be generated in the same manner as in FIGS. 9 and 10 based on the correlations at the sampling time k between the received signal of the M-th antenna element 21 and the received signals of the first, second, ..., (M−1−$\bar{q}$)-th antenna elements in the array antenna 20 and the correlations at the sampling time k between the received signal of the first antenna element 21 and the received signals of the ($\bar{q}$+2)-th, ($\bar{q}$+3)-th, ..., M-th antenna elements in the array antenna 20.

$$\Phi_f(k) \triangleq \begin{bmatrix} r_{1M}(k), & r_{2M}(k), & \cdots & r_{pM}(k) \\ r_{2M}(k), & r_{3M}(k), & \cdots & r_{2p,M}(k) \\ \vdots & \vdots & \ddots & \vdots \\ r_{L-\bar{q}-1,M}(k), & r_{L-\bar{q},M}(k), & \cdots & r_{m-\bar{q}-1,M}(k) \end{bmatrix} \triangleq \begin{bmatrix} \Phi_{f1}(k) \\ \Phi_{f2}(k) \end{bmatrix} \begin{matrix} \} p \\ \} M - \bar{q} - 2p \end{matrix} \quad (27)$$

$$\bar{\Phi}_f(k) \triangleq \begin{bmatrix} r_{\bar{q}+2,1}(k), & r_{\bar{q}+3,1}(k), & \cdots & r_{\bar{q}+p+1,1}(k) \\ r_{\bar{q}+3,1}(k), & r_{\bar{q}+4,1}(k), & \cdots & r_{\bar{q}+2,p+1,1}(k) \\ \vdots & \vdots & \ddots & \vdots \\ r_{L1}(k), & r_{L+1,1}(k), & \cdots & r_{M1}(k) \end{bmatrix} \triangleq \begin{bmatrix} \bar{\Phi}_{f1}(k) \\ \bar{\Phi}_{f2}(k) \end{bmatrix} \begin{matrix} \} p \\ \} M - \bar{q} - 2p \end{matrix}$$

$$\Phi_b(k) \triangleq \begin{bmatrix} r_{1M}(k), & r_{1,M-1}(k), & \cdots & r_{1L}(k) \\ r_{1,M-1}(k), & r_{1,M-2}(k), & \cdots & r_{1,L-1}(k) \\ \vdots & \vdots & \ddots & \vdots \\ r_{1,p+\bar{q}+1}(k), & r_{1+\bar{q}+p}(k), & \cdots & r_{1,\bar{q}+2}(k) \end{bmatrix} \triangleq \begin{bmatrix} \Phi_{b1}(k) \\ \Phi_{b2}(k) \end{bmatrix} \begin{matrix} \} p \\ \} M - \bar{q} - 2p \end{matrix}$$

$$\bar{\Phi}_b(k) \triangleq \begin{bmatrix} r_{M,M-\bar{q}-1}(k), & r_{M,,M-\bar{q}-2}(k), & \cdots & r_{M,L-\bar{q}-1}(k) \\ r_{M,M-\bar{q}-2}(k), & r_{M,,M-\bar{q}-3}(k), & \cdots & r_{M,L-\bar{q}}(k) \\ \vdots & \vdots & \ddots & \vdots \\ r_{Mp}(k), & r_{M,p-1}(k), & \cdots & r_{M1}(k) \end{bmatrix} \triangleq \begin{bmatrix} \bar{\Phi}_{b1}(k) \\ \bar{\Phi}_{b2}(k) \end{bmatrix} \begin{matrix} \} p \\ \} M - \bar{q} - 2p \end{matrix}$$

If M>2p+$\bar{q}$, each of the Hankel correlation matrices can be divided into two submatrices: a p×p matrix and a (M−2p−$\bar{q}$)×p matrix as shown in the right-hand members of Equation (27) rather than Equation (14). Thereafter, based on the above-described matrices, the directions can be estimated in the same manner as in an uncorrelated white noise environment, by generating the matrices $\Phi_1(k)$ and $\Phi_2(k)$ from Equation (15).

A base-station receiving apparatus can be constructed by combining the above-described direction tracking section 40 for tracking directions and a beam-forming unit for generating a receiving beam pattern such that the peaks are oriented towards the estimated directions-of-arrival.

Figure 12:
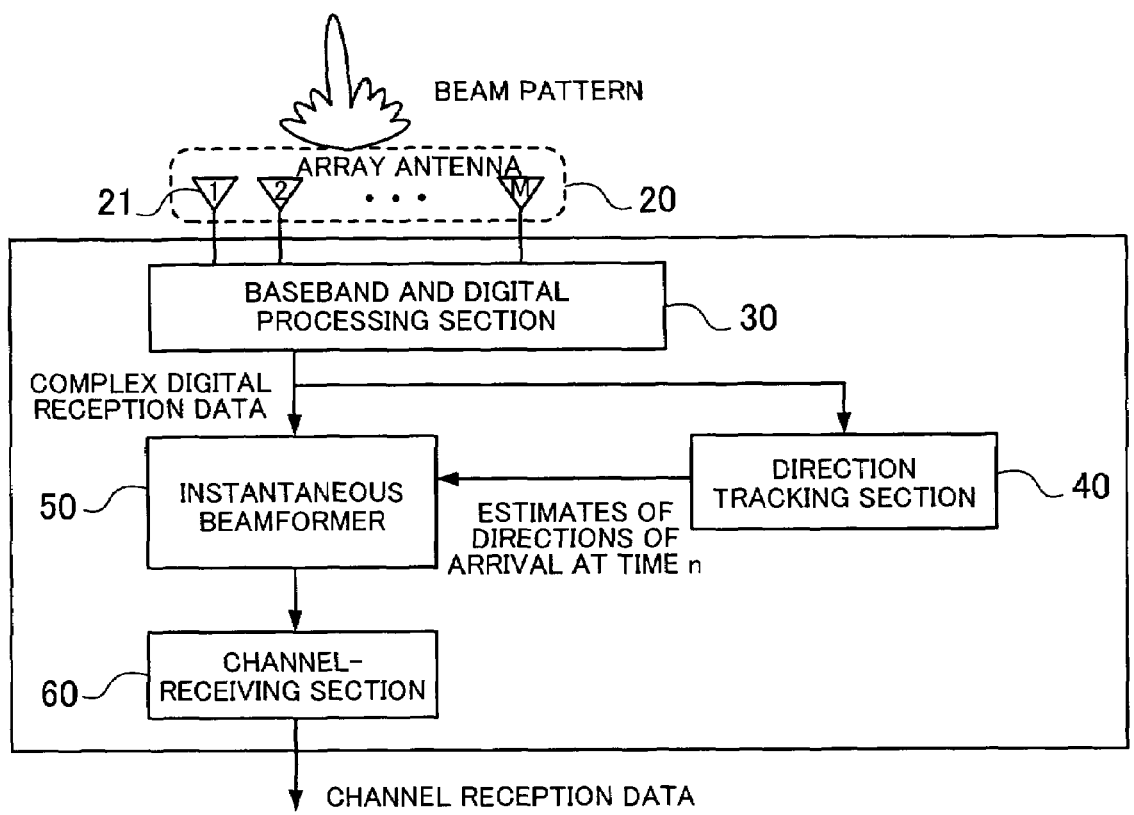
FIG. 12 is a diagram depicting the structure of a base-station receiving apparatus according to an embodiment.

FIG. 12 is a diagram depicting the structure of a base-station receiving apparatus according to the embodiment.

The base-station receiving apparatus is disposed in, for example, a base-station, and includes an array antenna 20, a baseband and digital processing section 30, a direction tracking section 40, an instantaneous beamformer 50, and a channel-receiving section 60.

The operation of the base-station receiving apparatus will be described briefly.

When the array antenna 20 receives a signal, the baseband and digital processing section 30 performs signal processing for every antenna element to output complex digital received data. The direction tracking section 40 receives the complex digital received data and performs the above-described processing of tracking the directions to calculate estimates of the directions-of-arrival at the direction updating time n. The instantaneous beamformer (receiving beamformer) 50 forms a beam such that the peaks are oriented towards the signal source based on the estimated directions-of-arrival. In short, the instantaneous beamformer 50 extracts a desired signal while suppressing interference and noise to send the desired signal to the channel-receiving section 60. The channel-receiving section 60 performs receiving processing by a known method to demodulate and output received data. Various structures are possible for the instantaneous beamformer 50 using information about directions-of-arrival obtained by the above-described direction tracking method according to this embodiment. To receive signals, a beam can be oriented towards the desired signal arrival directions by a beam formation method described in, for example, O. L. Frost, "An algorithm for linearly constrained adaptive array processing," Proc. IEEE, vol. 60, no. 8, pp. 926–935 (1975) and J. Xin, H. Tsuji, Y. Hase, and A. Sano, "Array beamforming based on cyclic signal detection," Proc. IEEE 48th Vehicular Technology Conference, pp. 890–894, Ottawa, Canada (1998).

A base-station transmitting apparatus can be constructed by combining the above-described direction tracking section 40 for tracking directions and a beam-forming unit for generating a transmission beam pattern such that the peaks are oriented towards estimated directions-of-arrival.

Figure 13:
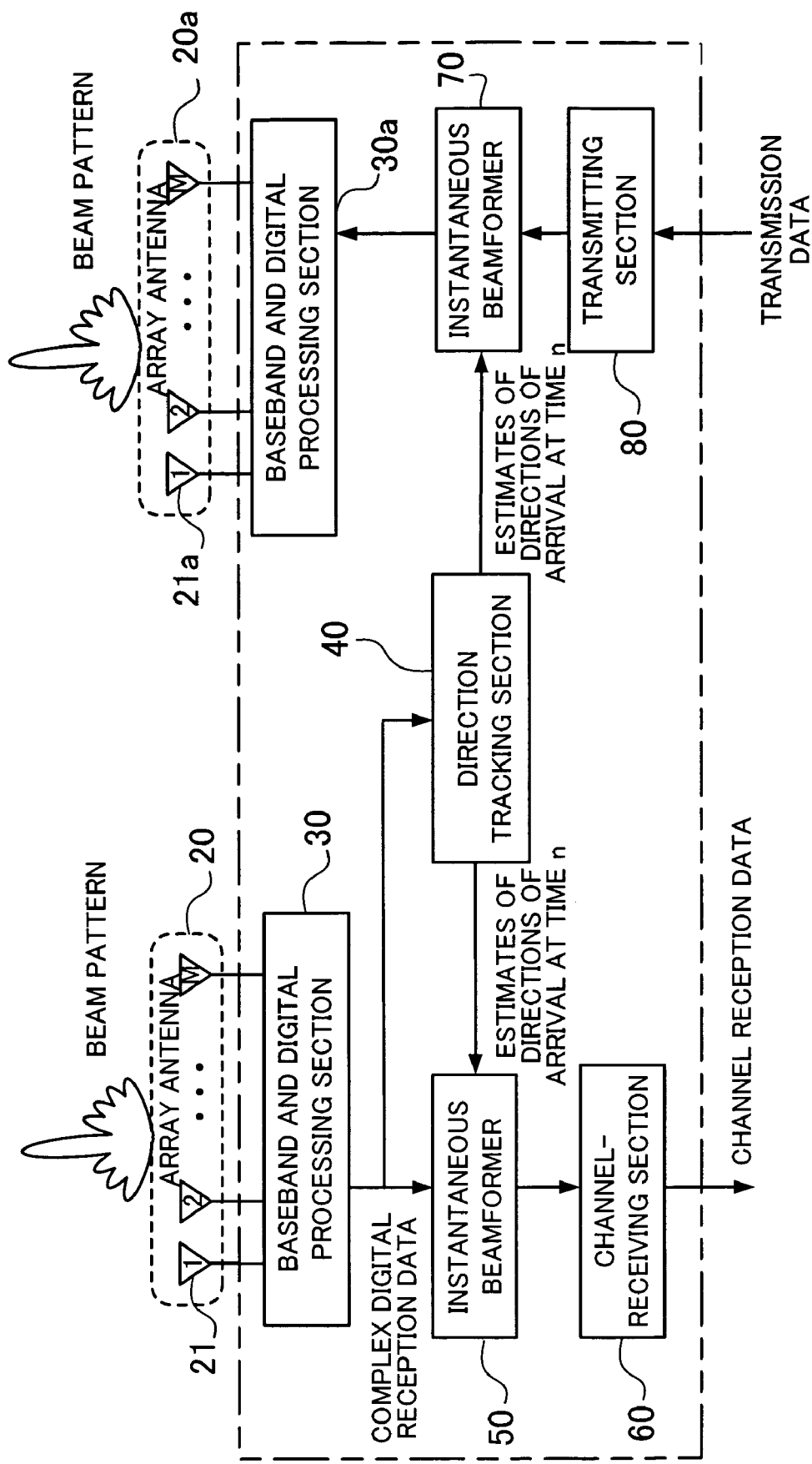
FIG. 13 is a diagram depicting the structure of a base-station transmitting apparatus according to an embodiment.
Figure 14:
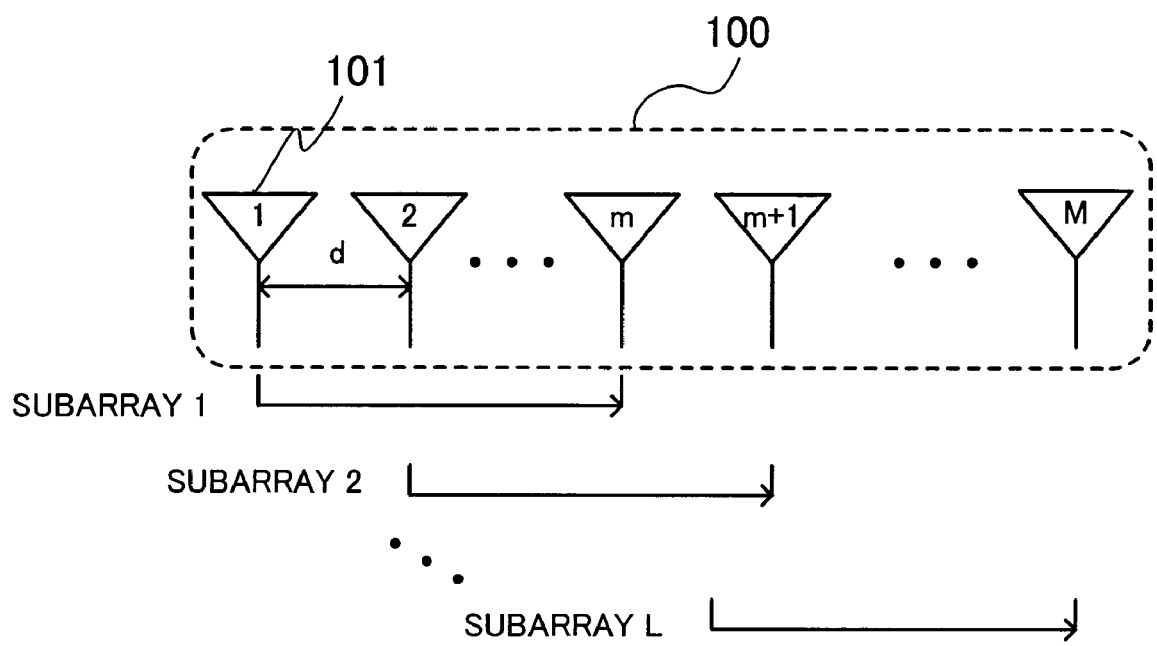
FIG. 14 is a diagram depicting subarrays in a uniform linear array.

FIG. 13 is a diagram depicting the structure of a base-station transmitting apparatus according to this embodiment. FIG. 13 includes the base-station receiving apparatus shown in FIG. 12.

When transmission data is input from a transmission section 80, an instantaneous beamformer (transmission beamformer) 70 forms a transmission beam pattern such that the peak are oriented towards the directions-of-arrival estimated by the direction tracking section 40 to send a complex digital transmission signal to a baseband and digital processing section 30. The baseband and digital processing section 30 converts the complex digital transmission data into a radio signal and sends it to each antenna element 21a in an array antenna 20a. As a result, a beam is emitted towards the receiving station to reduce the error rate. The array antennas 20 and 20a in FIG. 13 can be integrated into a single array antenna.

According to the present invention, state vectors of the directions-of-arrival at the current direction updating time are predicted with an observer by the use of the state vectors of the directions-of-arrival at the previous direction updating time to calculate provisional estimates of the directions-of-arrival, and furthermore, state vectors at the current direction updating time are calculated based on the provisional estimates, the predicted state vectors, and the predicted directions-of-arrival to estimate the directions-of-arrival from the state vectors. Therefore, the estimates of the directions can be calculated and hence the directions can be tracked accurately in real-time without increasing the computational load even in an environment where trajectories of the directions-of-arrival of direct waves and reflected waves intersect with one another due to the movement of the signal source (such as a calling party).

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A direction tracking method to track a direction-of-arrival of radio waves from a moving signal source by estimating directions-of-arrival of radio waves with an array antenna having a plurality of antenna elements arranged in different spatial locations along a straight line at identical adjacent spacing, the method comprising the steps of:
calculating an instantaneous correlation between data received by the antenna elements at each sampling time;
calculating an instantaneous correlation matrix from the instantaneous correlation;
estimating a noise subspace through a linear operation using the instantaneous correlation matrix;
predicting state vectors of directions-of-arrival at a current direction updating time with an observer by using state vectors of directions-of-arrival at a previous direction updating time;
calculating provisional estimates of the directions-of-arrival at the current direction updating time based on predicted values of the directions-of-arrival obtained from the predicted state vectors and based on the noise subspace;
calculating the state vectors at the current direction updating time based on the provisional estimates, the predicted state vectors, and the predicted values to calculate estimates of the directions-of-arrival; and
outputting the estimates of the directions-of-arrival for instantaneous beamforming.

2. The direction tracking method according to claim 1, wherein, if M indicates the number of the antenna elements, the instantaneous correlation matrix is obtained from correlations between received data of the M-th antenna element and received data of each of the first, second, . . . , (M−1)-th antenna elements and the directions-of-arrival of the radio waves are tracked in a temporally and spatially uncorrelated white noise environment.

3. The direction tracking method according to claim 1, wherein, if M indicates the number of the antenna elements, the instantaneous correlation matrix is obtained from correlations between received data of the first antenna element and received data of each of the second, third, . . . , M-th antenna elements and the directions-of-arrival of the radio waves are tracked in a temporally and spatially uncorrelated white noise environment.

4. The direction tracking method according to claim 1, wherein, if M indicates the number of the antenna elements and $\bar{q}$ indicates the length of spatial correlation of noise, the instantaneous correlation matrix is obtained from correlations between received data of the first antenna element and received data of each of the $(\bar{q}+2)$-th, $(\bar{q}+3)$-th, . . . , M-th antenna elements and the directions-of-arrival of the radio waves are tracked in a spatially correlated noise environment.

5. The direction tracking method according to claim 1, wherein, if M indicates the number of the antenna elements and $\bar{q}$ indicates the length of spatial correlation of noise, the instantaneous correlation matrix is obtained from correlations between received data of the M-th antenna element and received data of each of the first, second, . . . , (M−1−$\bar{q}$)-th antenna elements and the directions-of-arrival of the radio waves are tracked in a spatially correlated noise environment.

6. The direction tracking method according to claim 1, wherein one to four of the instantaneous correlation matrix is generated based on the instantaneous correlation and the noise subspace is estimated using the one to four of the instantaneous correlation matrix.

7. The direction tracking method according to claim 1, wherein the noise subspace is estimated through an adaptive algorithm using a fixed or time-varying step-size.

8. The direction tracking method according to claim 7, wherein the adaptive algorithm is a least-square-mean (LMS) technique or a normalized least-square-mean (NLMS) technique.

9. The direction tracking method according to claim 1, wherein the provisional estimates of directions are calculated using an approximate Newton technique.

10. The direction tracking method according to claim 1, wherein each of the state vectors is defined by the direction-of-arrival and the velocity and acceleration of the direction-of-arrival.

11. The direction tracking method according to claim 1, wherein an interval for renewing calculation of the directions-of-arrival is longer than a sampling period and the relationship between the direction updating time and the sampling time is written as k=nN, nN+1, . . . , (n+1)N−1, where N indicates the number of snapshots in the interval for renewing calculation of the directions-of-arrival, n indicates the direction updating time, and k indicates the sampling time.

12. The direction tracking method according to claim 1, wherein directions-of-arrival of coherent signals in a temporally and spatially uncorrelated white noise environment are tracked.

13. The direction tracking method according to claim 1, wherein directions-of-arrival of correlated signals in a temporally and spatially uncorrelated white noise environment are tracked.

14. The direction tracking method according to claim 1, wherein directions-of-arrival of uncorrelated signals in a temporally and spatially uncorrelated white noise environment are tracked.

15. The direction tracking method according to claim 1, wherein directions-of-arrival of coherent signals in a spatially correlated noise environment are tracked.

16. The direction tracking method according to claim 1, wherein directions-of-arrival of correlated signals in a spatially correlated noise environment are tracked.

17. The direction tracking method according to claim 1, wherein directions-of-arrival of uncorrelated signals in a spatially correlated noise environment are tracked.

18. A direction tracking apparatus to estimate directions-of-arrival of radio waves with an array antenna having a plurality of antenna elements arranged in different spatial locations along a straight line at identical adjacent spacing, the apparatus comprising:
instantaneous-correlation calculation means for calculating an instantaneous correlation between data received by an antenna element and data received by another antenna element in the array antenna at each sampling time;
instantaneous-correlation-matrix calculation means for calculating an instantaneous correlation matrix from the instantaneous correlation;

noise-subspace estimation means for estimating a noise subspace through a linear operation using the instantaneous correlation matrix;

direction-of-arrival prediction means for predicting state vectors of directions-of-arrival at a current direction updating time with an observer by using state vectors of directions-of-arrival at a previous direction updating time;

provisional-value calculation means for calculating provisional estimates of the directions-of-arrival at the current direction updating time based on predicted values of the directions-of-arrival obtained from the predicted state vectors and based on the noise subspace; and estimate calculation means for calculating the state vectors at the current direction updating time based on the provisional estimates, the predicted state vectors, and the predicted values to calculate estimates of the directions-of-arrival.

19. A base-station apparatus for receiving radio waves with an array antenna having a plurality of antenna elements arranged in different spatial locations along a straight line at identical adjacent spacing, the apparatus comprising:

a direction tracking section, the direction tracking section comprising:

instantaneous-correlation calculation means for calculating an instantaneous correlation between data received by an antenna element and data received by another antenna element in the array antenna at each sampling time;

instantaneous-correlation-matrix calculation means for calculating an instantaneous correlation matrix from the instantaneous correlation;

noise-subspace estimation means for estimating a noise subspace through a linear operation using the instantaneous correlation matrix;

direction-of-arrival prediction means for predicting state vectors of directions-of-arrival at a current direction updating time with an observer by using state vectors of directions-of-arrival at a previous direction updating time;

provisional-value calculation means for calculating provisional estimates of the directions-of-arrival at the current direction updating time based on predicted values of the directions-of-arrival obtained from the predicted state vectors and based on the noise subspace; and estimate calculation means for calculating the state vectors at the current direction updating time based on the provisional estimates, the predicted state vectors, and the predicted values to calculate estimates of the directions-of-arrival; and a beam-forming section for receiving the estimates to form a beam with peaks oriented towards estimated directions-of-arrival.

* * * * *